Patented Aug. 25, 1953

2,649,766

UNITED STATES PATENT OFFICE 2,649,766

ELECTROLYTES FOR WET-CELL STORAGE BATTERIES

Floyd A. Johnson, Price, Utah

No Drawing. Application October 18, 1947,
Serial No. 780,772

9 Claims. (Cl. 136—154)

This invention relates to a chemical composition of matter to be utilized as an electrolyte for wet-cell storage batteries, and to the storage batteries containing the said electrolyte.

More particularly the invention provides a very economical and highly efficient electrolyte for use in wet-cell storage batteries, preferably the wet-cell, lead-type storage batteries which undergoes very little if any evaporation, causes no corrosion of the battery poles, battery carrier and metal parts maintained within the vicinity of the said battery, is safe to handle, does not destroy clothing with which it comes in contact, prevents the battery from becoming discharged on an open circuit, prolongs the life of the battery in which it is contained, and enables the battery to regenerate electrical power automatically without external assistance when the said battery is on discharge, said electrolyte broadly comprising a solution containing metallic ions, preferably metallic ions selected from a group described hereinafter.

The invention further relates to the electrical storage batteries containing the novel electrolyte described hereinabove, said electrical batteries possessing the particular advantage, due to the absence of any acid or if present to the extremely low percentage of the acid in the electrolyte, of being able to be constructed of very inexpensive, slightly acid resistant and slightly corrosive resistant material.

The electrolyte employed in the conventional wet-cell, lead-type storage battery heretofore comprises sulfuric acid of specific gravity of between about 1.25 and about 1.30, i. e. about 33% to about 40% sulfuric acid. The use of such a substance as an electrolyte has many disadvantages. One of the disadvantages being the fact that there is a rapid evaporation of water from such an electrolyte when the battery in which it is contained is in use and there must be a close observation of the electrolyte to see that it is maintained at the proper liquid level or there will be a resultant deleterious effect on the plates. In addition the use of such an electrolyte causes constant corrosion of the battery poles, carrier and various metal parts maintained within the near vicinity of the battery, the products of the corrosion having a deleterious effect on the parts with which it comes in contact. This disadvantage is of particular importance in the case of the large batteries utilized in the large trucks wherein the corrosion, at times, is so serious as to require a constant cleaning, processing and replacing of battery parts. In addition the conventional electrolyte is dangerous to handle and may cause serious burns, particularly in the case of an accident where the electrolyte might be brought in contact with a person's clothes or body. Furthermore the batteries containing the sulfuric acid as electrolyte cannot be stored for any great length of time without the said battery losing its charge and requiring the owner to constantly recharge the battery to keep it in good condition. Still further the strong acid electrolyte has a deleterious effect on the lead poles and as a result shortens the life span of the battery. In addition the batteries containing the sulfuric acid as the electrolyte have very little recuperative power, particularly when it has been subjected to a relatively slow discharge, and the battery must then be removed and carried to a service station for a recharge.

It is an object of the invention, therefore, to overcome the above-described and other difficulties and provide a very economical and highly efficient electrolyte for use in wet-cell storage batteries. It is a further object of the invention to provide an electrolyte for wet-cell storage batteries, preferably the lead-type, wet-cell storage batteries which will undergo very little if any evaporation and thus eliminate the necessity of constantly adding water to the said batteries. It is a further object of the invention to provide an electrolyte for wet-cell storage batteries, preferably of the lead-type, which causes no corrosion of the battery cables, carrier and metal parts maintained within the near vicinity of the said battery. It is still a further object of the invention to provide an electrolyte for wet-cell storage batteries which is safe to handle and will not destroy clothing with which it may come in contact or injure any person who might have it on his skin. It is a further object to provide an electrolyte for wet-cell, lead-type storage batteries which will assist in prolonging the life of the said batteries. It is a further object of the invention to provide an electrolyte for wet-cell storage batteries which will enable the battery to regenerate power automatically without any external assistance when the said battery has been discharged. It is still a further object of the invention to provide novel wet-cell storage batteries which may be produced at a very low cost and yet remain active for much longer periods of time than many of the wet-cell storage batteries now in production. It is a still a further object to provide novel wet-cell storage batteries which may be constructed of very inexpensive, low acid resistant material. It is a further object of the invention to provide a wet-cell storage battery that may be stored for long periods of time without undergoing discharge on open circuit. It is still a further object of the invention to provide a chemical composition that may be utilized to preserve the charge in any wet-cell storage battery when the said battery is being maintained on an open circuit. Other objects of the invention will be apparent from the detailed description given hereinafter.

It has now been discovered that these and other objects may be accomplished by the employment as an electrolyte for the wet-cell storage batteries a solution containing metallic ions, preferably metallic ions selected from a group described hereinafter. When such an electrolyte is employed in a wet-cell storage battery it has been found that there is little if any evaporation from the battery, there is no corrosion of the battery carrier, etc. the battery may be stored for long periods of time on open circuit without undergoing a discharge, the battery is able to regenerate itself after it has been subjected to a slow discharge to a sufficient degree to start an automobile engine, and the battery containing the novel electrolyte has been found to have a much longer life span than any similar battery utilizing the conventional sulfuric acid as the electrolyte.

As described above the novel electrolyte of the invention broadly comprises a solution containing metallic ions, preferably metallic ions selected from a group described hereinafter. The metals whose salts may be employed in the preparation of the novel electrolyte include the metals listed in the Mendelyeev Periodic Table. Examples of some of these metals are the metals found in the first to seventh and eighth group of the said Periodic Table. Examples of the metals in the first group of the table whose salts may be utilized in the novel electrolyte are copper, rubidium, silver and cesium. Examples of the metals in the second group whose salts may be utilized in the novel electrolyte are berylium, zinc, strontium, cadmium and barium. Examples of the metals in the third group whose salts may be utilized in the novel electrolyte are boron, aluminum, scandium, gallium and the rare earth metals. Examples of the metals in the fourth group whose salts may be utilized are titanium, germanium, zirconium and tin. Examples of the metals in the fifth group whose salts may be utilized in the novel electrolyte are vanadium and antimony. Examples of the metals in the sixth group whose salts may be added to the electrolyte are chromium, selenium, molybdenum, tungsten and polonium. Examples of the metals in the eighth group whose salts may be added to the novel electrolyte are iron, cobalt, nickel, platinum, palladium and osmium.

A preferred group of the metals which may furnish ions for the novel electrolyte are the metals of the group comprising calcium, sodium, potassium, vanadium, titanium, boron, chromium, aluminum, iron, copper and zinc.

An exceptionally fine electrolyte is obtained when the salts of vanadium are added to the said electrolyte.

The quantity of each of the salts to be employed in the novel electrolyte may vary over a considerable range depending upon the type of electrolyte desired and the number of different salts to be employed. In most cases the quantity of the salts employed will be relatively small and will, in general, be sufficient to furnish from about .001 gram to about 1.5 grams per 1000 cc. of electrolyte of the desired metal. The preferred quantity of each salt to be employed is that sufficient to furnish from about .01 gram to about .5 gram per liter of electrolyte of the desired metal. The exact amount of each salt to be employed may best be determined, however, for each individual case.

The number of different kinds of salts to be employed in the electrolyte may also vary over a considerable range depending upon the type of electrolyte desired. In some cases it is preferred to employ salts of at least two different kinds of metals, preferably selected from the preferred group described above. In some cases it may be desirable to just employ one type of salt, such as, for example, a vanadium salt.

The total quantity of the salts to be employed in the novel electrolyte will depend upon a number of factors, such as the quality of electrolyte desired, the presence of acid in the electrolyte, etc. The total quantity of the salts should not fall too low or the electrolyte will not function properly. Thus, the quantity of salts found in ordinary tap water is, in most cases, too low for use in the novel electrolyte. It is also desirable not to permit the total amount of the salts to become too large, particularly when acid is present in the electrolyte. With acid present in the electrolyte very efficient electrolytes have been obtained when the total quantity of salts in the solution is sufficient to furnish from about .3 gram to about 5.8 grams of the metals per liter of electrolyte and these are the preferred amount to be utilized. When no acid is present the preferred amount of salts to be employed is that sufficient to furnish from about .3 gram and large amounts, e. g. of the order of about 10 grams, of the metals per liter of the electrolyte.

As used throughout the specification and claims the expression "metallic ions" is meant to include the ions of metals formed in solution by the addition thereto of a soluble, ionizable salt of the desired metal. Thus, iron ions may be obtained in solution by the addition thereto of iron salts, such as iron chloride, iron sulfate, and the like. Soluble salts of the above-described metals which may be used for the preparation of the solutions containing the metallic ions includes the acetates, sulfates, etc. Salts which are of course known to be injurious to the plates of the battery should not be employed. The sulfates are usually the more preferred as they are easily obtained and, in most cases, are highly soluble in aqueous solutions, or, if employed, in the slightly acid solutions of the electrolyte.

If the metal desired in the electrolyte is multivalent the salts of that metal selected may be those which furnish ions of the said metal carrying any of the various charges or valences possible for such metal. It is preferred in most cases to utilize salts which contain the metal in the oxidized form wherever possible.

The novel electrolyte will function very efficiently without the addition of any acid. However, it may be desirable, in some cases, to add some acid in order to assist in dissolving the salts, lower the freezing point of the solution, etc. The preferred amount of the acid to be added will vary between about .1% to about 10%.

If an acid is to be employed in the electrolyte it may be either an inorganic acid such as sulfuric acid, titanic acid, phosphoric acid, sulfurous acid or boric acid or any organic acid such as acetic acid, propionic acid, benzoic acid or phthalic acid. Inorganic acids, such as sulfuric acid are usually the more preferred.

Other materials which do not interfere with the efficiency of the electrolyte may be added to the solution if desired. Coloring material such as aniline dyes may be added to the electrolyte to give it the desired color if so desired. Organic compounds which have a sufficiently high dielectric constant may be added to the electrolyte to assist in lowering its freezing point. Such organic compounds includes allyl alcohol, sec-butyl alcohol, glycerine, etc. Buffer systems such as acetic acid and its sodium salt may be added to the electrolyte if desired in order to maintain the pH of the electrolyte within a definite range.

In preparing the novel electrolyte the desired amount of salts sufficient to give the desired amount of the metals are dissolved in the water containing the various other ingredients which are to be employed therewith. In the case the electrolyte is to contain acid the preferred method is to prepare the acid solution first and then dissolve the salts in the acid solution.

The preferred battery in which the novel electrolyte is to be employed is the wet-cell, lead-type storage battery, i. e. wherein the negative pole is made up of lead and the positive pole is made up of lead oxide when the said battery is on charge. The novel electrolyte may be utilized in wet-cell storage batteries which have contained no other electrolyte and have just been recently manufactured or they may be introduced into wet-cell storage batteries which have been in use with a different type of electrolyte. It is usually preferred to employ the electrolyte in batteries that have just been recently manufactured. In utilizing the electrolyte in batteries which have already contained a different electrolyte it will be necessary to remove the other electrolyte, taking precautions not to disturb any of the deposits in the bottom of the battery which might get between the plates and short the battery. After as much as possible of the old electrolyte has been removed the novel electrolyte may then be added to the cells in sufficient amount to cover the plates and the battery is then in condition for operation. In case the transformation is to be accomplished on a wet-cell, lead-type storage battery containing sulfuric acid as the electrolyte it is desirable to have the battery, before the transformation takes place, as completely charged as possible in order to insure that most of the sulfuric acid is in solution and not on the plates as lead sulfate, otherwise after operating the battery the acidity of the electrolyte will be much higher than anticipated.

If the battery to be utilized possesses the required type of electrolyte the metallic ions may be added as a dry powder directly to each cell of the battery and thereby create the novel electrolyte within the battery without having to first remove the old electrolyte.

To illustrate how the novel electrolyte and batteries may be prepared and utilized the following examples are presented. It is to be understood, however, that the cited examples are for the purpose of illustration only and are not to be regarded as limiting the invention in any way.

EXAMPLE I

An electrolyte is made up by adding .7 gram of aluminum acetate, 1.2 grams of boron nitride, 1.9 grams of magnesium sulfate, .3 gram of copper sulfate, .3 gram of zinc sulfate, .6 gram of chromium sulfate, .8 gram of ferrous sulfate, .6 gram of titanyl sulfate and .6 gram of vanadium sulfate to 3700 cc. of .5% sulfuric acid. This solution is introduced into the cells of a new automobile 3 cell lead-type storage battery which was recently manufactured and contained no electrolyte. When the above-described battery is placed in an automobile it is found that the engine may be readily started and the lights go on as bright as when a conventional type battery is employed.

Comparative Performance Test No. I

The electrolyte prepared in Example I above is placed in the storage batteries of a heavy moving van truck and a heavy gasoline delivery truck. After 25,000 miles of service it is reported that no difficulty whatsoever has been experienced with the operation of the battery, it is not necessary to add any water during this period of service, and there has been no corrosion of the battery carrier, etc. After the 25,000 mile service run the batteries are discharged and then allowed to recuperate.. After 1 hour of recuperation, the battery was able to start the truck engine and furnish energy for the lights.

Comparative Performance Test No. II

The electrolyte prepared in Example I is placed in a passenger automobile storage battery and utilized in that capacity in a hot, southern State for a period of 3½ years. After that period of almost constant operation the battery is torn apart and the plates examined for any decomposition. The examination shows that even after 3½ years of service the plates are in far superior condition than plates taken from a storage battery containing sulfuric acid electrolyte after 2 years of service. During the test period water is added to the electrolyte only three times, there is no corrosion of the carrier, etc. and the battery always retains its power to recuperate after a discharge.

An electrolyte is prepared as in Example I above with the exception that the acid content is increased to 10% and 5% glycerin is added to the said electrolyte. This electrolyte is then placed in a storage battery of a passenger automobile that is to be utilized in a northern Rocky Mountain State which experiences cold weather during the winter months. During the test period it is only necessary to add water two times, the battery showed no corrosion on the carrier, etc. and the battery retained its power to recuperate after a discharge.

A battery containing the electrolyte of Example I is still in use in a hot southern State even after 4 years of service.

Comparative Performance Test No. III

A conventional type battery (containing 40% sulfuric acid as the electrolyte) and a storage battery containing the electrolyte of Example I are placed in storage on open circuit for 1 year. At the end of the year the conventional type battery is dead and must be recharged. The battery containing the novel electrolyte when placed in an automobile has sufficient power left to start the engine.

EXAMPLE II

Another electrolyte is prepared by adding .8 gram of zinc acetate, .5 gram of cupric sulfate, .9 gram of chromium potassium sulfate, 1 gram of ferrous oxalate, 1 gram of calcium sulfate, .8 gram of titanium oxalate, and 1.2 grams of vanadium sulfate to 3700 cc. of .5% sulfuric acid solution. After stirring the solution for 30 minutes the liquid is poured off from any precipitate and is utilized as an electrolyte. This solution is placed in various lead-type storage batteries and the said batteries subjected to the same tests as described in Comparative Performance Tests I and II above. In all instances the electrolyte passes the tests with the same superior performance as the electrolytes prepared in Example I.

EXAMPLE III

An electrolyte is prepared in the same manner as described in Example I and another prepared as in Example II with the exception that the metallic salts are placed in 3700 cc. solution of distilled water, free of any acid. While in this case not as much of the salts dissolved in the water as when acid is present but the saturated solution passed the same tests as described in Comparative Performance Tests I and II.

EXAMPLE IV

An electrolyte is prepared by adding .6 gram of boron nitride, .3 gram of vanadium sulfate, 1 gram of titanium sulfate and .8 gram of aluminum acetate in 3700 cc. of 3% sulfuric acid. The solution is drawn off and utilized as an electrolyte. This electrolyte passes the same tests as those described hereinabove.

EXAMPLE V

An electrolyte is prepared by adding .8 gram of vanadium sulfate, 1 gram of cuprous sulfate, .6 gram of zinc acetate and .8 gram of chromium potassium sulfate to 3700 cc. of 3% acetic acid. The solution is drawn off and utilized as an electrolyte. This electrolyte passes the same tests as those described in Comparative Performance Tests I and II.

EXAMPLE VI

An electrolyte is prepared by adding .8 gram of vanadium sulfate, .5 gram of calcium sulfate, 1 gram of magnesium sulfate, and .9 gram of chromium oxalate to 3700 cc. of 3% benzoic acid. The solution is drawn off and utilized as an electrolyte. This electrolyte passes the same tests as those described hereinabove for the other electrolytes.

I claim as my invention:

1. An electrolyte for use in lead-type storage batteries consisting essentially of 3700 parts of distilled water containing the following inorganic salts dissolved therein, .7 part of aluminum sulfate, 1.2 parts of boron nitride, 1.9 parts of magnesium sulfate, .3 part of copper sulfate, .3 part of zinc sulfate, .6 part of chromium sulfate, .8 part of ferrous sulfate, .6 part of titanyl sulfate, .5 part of calcium sulfate, and about .6 part of vanadium sulfate, all of the aforedescribed parts being parts by weight.

2. An electrolyte for use in lead-type storage batteries consisting essentially of 3700 parts of distilled water containing the following inorganic salts dissolved therein, .26 part of zinc sulfate, .16 part of copper sulfate, .6 part of chromium potassium sulfate, 1 part of ferrous sulfate, .4 part of titanyl sulfate and about .8 part of vanadium sulfate, all of the aforedescribed parts being parts by weight.

3. An electrolyte for use in lead-type storage batteries consisting essentially of distilled water containing inorganic salts having some solubility and being at least partially ionizable in water of the following metals dissolved therein, silicon, calcium, magnesium, sodium, iron, copper, aluminum, zinc, boron, vanadium, chromium and titanium, said salts being added to the water in sufficient amount to furnish in solution from .001 to 1.5 parts of the metal per 1000 parts by weight of water, the total amount of the metals in the solution being less than 5.8 parts per 1000 parts by weight of water and the anions of the said salts being those which do not have any deleterious effect on the lead plates of the said batteries.

4. An electrolyte for use in lead-type storage batteries consisting essentially of distilled water containing inorganic salts having some solubility and being at least partially ionizable in water of the following metals dissolved therein, copper, calcium, sodium, potassium, iron, zinc, aluminum, boron, chromium, titanium and vanadium, said salts being added to the water in amount sufficient to furnish in solution from .001 to 1.5 parts of each of the metals per 1000 parts by weight of solution, the total amount of the metals in the water being less than 5.8 parts per 1000 parts by weight of water and the anions of the said salts being those which do not have any deleterious effect on the lead plates of the said batteries.

5. An electrolyte for use in lead-type storage batteries consisting essentially of distilled water containing an inorganic salt of vanadium having some solubility and being partially ionizable in water and at least one inorganic salt having some solubility and being partially ionizable in water of a metal of the group consisting of silicon, calcium, sodium, potassium, iron, zinc, aluminum, boron, chromium, titanium, copper and magnesium dissolved therein, said salts being added to the water in amount sufficient to furnish in solution from .001 to 1.5 parts of each of the said metals per 1000 parts by weight of water with the total amount of the metals in solution being less than 5.8 parts per 1000 parts by weight of water, and the anions of the said salts being those which do not destroy the activity of the lead plates of the said storage batteries.

6. An electrolyte for use in lead-type storage batteries consisting essentially of 3700 parts of a .1% to .5% solution of sulfuric acid containing the following inorganic salts dissolved therein, .7 part of aluminum sulfate, 1.2 parts of boron nitride, 1.9 parts of magnesium sulfate, .3 part of copper sulfate, .3 part of zinc sulfate, .6 part of chromium sulfate, .8 part of ferrous sulfate, .6 part of titanyl sulfate, .5 part of calcium sulfate, and about .6 part of vanadium sulfate, all of the aforedescribed parts being parts by weight.

7. An electrolyte for use in lead-type storage batteries consisting essentially of a solution of sulfuric acid containing no more than 3% sulfuric acid and containing an inorganic salt of vanadium having some solubility and being partially ionizable in the said acid solution and at least one inorganic salt having some solubility and being partially ionizable in the said acid solution of a metal of the group consisting of silicon, calcium, sodium, potassium, iron, zinc, aluminum, boron, chromium, titanium, copper and magnesium dissolved therein, said salts being added to the solution in amount sufficient to furnish in solution from .001 to 1.5 parts of each of the said metals per 1000 parts by weight of acid solution with the total amount of the metals in solution being less than 5.8 parts per 1000 parts by weight of acid solution, and the anions of the said salts being those which do not destroy the activity of the lead plates of the said storage batteries.

8. An electrolyte for use in lead-type storage batteries consisting essentially of 3700 parts of a sulfuric acid solution containing no more than 3% sulfuric acid and containing dissolved therein inorganic salts which are soluble in water and ionizable in weak acid solutions and are salts of the following metals, calcium, magnesium, sodium, iron, copper, aluminum, zinc, boron, vanadium, chromium, titanium and silicon, said salts being added to the acid solution in amounts sufficient to furnish in solution from .001 to 1.5 parts of each of the said metals per 1000 parts by weight of solution with the total amount of the metals in solution being less than 5.8 parts per 1000 parts by weight of solution, and the anions of the said salts being those which do not destroy the activity of the lead plates of the said storage batteries.

9. An electrolyte as in claim 8 wherein the anions of the added salts are selected from the group consisting of the sulfate, acetate and oxalate radicals and the halide ions.

FLOYD A. JOHNSON.

References Cited in the file of this patent

UNITED STATES PATENTS

| Number | Name | Date |
|---|---|---|
| 342,385 | Remington | May 25, 1886 |
| 759,066 | Betts | May 3, 1904 |
| 1,011,485 | Pfleiderer | Dec. 12, 1911 |
| 1,429,830 | Banks | Sept. 19, 1922 |
| 2,317,076 | Micks et al. | Apr. 20, 1943 |
| 2,433,871 | Sutherland et al. | Jan. 6, 1948 |

FOREIGN PATENTS

| Number | Country | Date |
|---|---|---|
| 679,339 | France | Apr. 11, 1930 |
| 371,324 | Great Britain | Oct. 15, 1930 |
| 352,768 | Great Britain | July 16, 1931 |
| 717,668 | France | Oct. 20, 1931 |
| 389,738 | Great Britain | Mar. 23, 1933 |

OTHER REFERENCES

Scientific American, "A New Primary Battery," May 20, 1899, page 333.

Vinal: Storage Batteries, 2nd ed., 1930, page 106.

Dept. of Commerce, National Bureau of Standards, "Battery Compounds and Solution," Letter Circular 302, May 15, 1931, pages 1–4.